US010970671B2

(12) United States Patent
Liao et al.

(10) Patent No.: US 10,970,671 B2
(45) Date of Patent: Apr. 6, 2021

(54) WIRELESS AUTHENTICATION METHOD AND DEVICE OF RECYCLABLE LOGISTICS APPARATUS

(71) Applicant: SHANGHAI HONGYAN RETURNABLE TRANSIT PACKAGINGS CO., LTD, Shanghai (CN)

(72) Inventors: Qingxin Liao, Shanghai (CN); Chunjiang Ye, Shanghai (CN); Yiwen Cao, Shanghai (CN)

(73) Assignee: SHANGHAI HONGYAN RETURNABLE TRANSIT PACKAGINGS CO., LTD, Shanghai (CN)

( * ) Notice: Subject to any disclaimer, the term of this patent is extended or adjusted under 35 U.S.C. 154(b) by 352 days.

(21) Appl. No.: 15/555,388

(22) PCT Filed: Mar. 4, 2016

(86) PCT No.: PCT/CN2016/075638
§ 371 (c)(1),
(2) Date: Sep. 1, 2017

(87) PCT Pub. No.: WO2016/138876
PCT Pub. Date: Sep. 9, 2016

(65) Prior Publication Data
US 2018/0041501 A1 Feb. 8, 2018

(30) Foreign Application Priority Data

Mar. 4, 2015 (CN) .................... 201510097246.X

(51) Int. Cl.
*G06Q 10/08* (2012.01)
*G06F 21/44* (2013.01)
(Continued)

(52) U.S. Cl.
CPC ........... *G06Q 10/087* (2013.01); *B65D 25/00* (2013.01); *G06F 21/44* (2013.01); *H04L 29/08* (2013.01);
(Continued)

(58) Field of Classification Search
CPC . H04L 63/08; H04L 63/0853; H04L 63/0876; H04L 29/08; H04W 4/80;
(Continued)

(56) References Cited

U.S. PATENT DOCUMENTS 7,768,392 B1   8/2010   Brand et al.
8,279,067 B2   10/2012  Berger et al.
(Continued)

FOREIGN PATENT DOCUMENTS

CN   101561919   10/2009
CN   201516948    6/2010
(Continued)

OTHER PUBLICATIONS

Supplementary European Search Report, issued in the corresponding European patent application No. 16758491.1, dated Nov. 26, 2018, 17 pages.
(Continued)

*Primary Examiner* — Robert B Leung
*Assistant Examiner* — Adrian Stoica
(74) *Attorney, Agent, or Firm* — Hamre, Schumann, Mueller & Larson, P.C.

(57) ABSTRACT

The disclosure relates to wireless authentication method and device of recyclable logistics apparatus. The recyclable logistics apparatus includes a wireless beacon unit which periodically transmits a broadcast frame. The broadcast frame includes a unique identity of the wireless beacon unit. The method includes first mobile terminal receiving the broadcast frame and uploading collected first frame infor-
(Continued)

mation as first upload information to a cloud server, the cloud server generating authentication information according to an authentication rule; the cloud server associating the first upload information with the authentication information and storing them in a database; and the cloud server transmitting the authentication information to second mobile terminal, the second mobile terminal receiving the broadcast frame and through the authentication information, collected second frame information being compared with the first frame information which is associated with the authentication information.

7 Claims, 6 Drawing Sheets

(51) Int. Cl.
*H04L 29/06* (2006.01)
*H04W 12/06* (2021.01)
*H04W 4/80* (2018.01)
*B65D 25/00* (2006.01)
*H04L 29/08* (2006.01)

(52) U.S. Cl.
CPC ......... *H04L 63/0853* (2013.01); *H04W 12/06* (2013.01); *H04W 4/80* (2018.02)

(58) Field of Classification Search
CPC ... H04W 12/06; H04W 12/0608; G06F 21/30; G06F 21/44; G06Q 10/083; G06Q 10/0838; G06Q 10/087; G06Q 10/0875; B65D 25/00
See application file for complete search history.

(56) References Cited

U.S. PATENT DOCUMENTS

| | | | |
|---|---|---|---|
| 8,477,013 B2 | 7/2013 | Sarma et al. | |
| 2006/0091206 A1 | 5/2006 | Olsen et al. | |
| 2009/0322510 A1* | 12/2009 | Berger | G06Q 10/08 340/539.1 |
| 2013/0006877 A1* | 1/2013 | Brooks | G06Q 30/0185 705/318 |
| 2014/0351098 A1* | 11/2014 | Shafer | G06Q 10/087 705/28 |
| 2015/0120504 A1* | 4/2015 | Todasco | G06Q 20/322 705/26.61 |
| 2015/0120598 A1* | 4/2015 | Fadell | G06Q 10/083 705/333 |
| 2015/0154540 A1* | 6/2015 | Skaaksrud | H04W 12/06 705/333 |
| 2016/0042351 A1* | 2/2016 | Syed | G06O 20/3221 705/39 |
| 2016/0048796 A1* | 2/2016 | Todasco | G06Q 10/083 705/330 |

FOREIGN PATENT DOCUMENTS

| | | | |
|---|---|---|---|
| CN | 102567854 | 7/2012 | |
| CN | 103473660 | * 12/2013 | ............ G06Q 10/08 |
| CN | 103810580 | 5/2014 | |
| CN | 103955813 | 7/2014 | |
| CN | 104066089 | 9/2014 | |
| CN | 104143153 | 11/2014 | |
| CN | 104735059 | 6/2015 | |
| JP | 2007-286922 | 11/2007 | |
| WO | 2006/057390 | 6/2006 | |
| WO | 2015/070055 | 5/2015 | |
| WO | 2015/184055 | 12/2015 | |
| WO | 2016/078573 | 5/2016 | |

OTHER PUBLICATIONS

Australian Examination Report, issued in the corresponding Australian patent application No. 2016228029, dated Nov. 2, 2018, 9 pages.

Japanese Office Action, issued in the corresponding Japanese patent application No. 2017-546721, dated Octobe 30, 2018, 11 pages (including machine translation).

International Search Report for international application No. PCT/CN2016/075638, dated Jun. 7, 2016 (4 pages, including English translation).

* cited by examiner

Folded

Upright

WIRELESS AUTHENTICATION METHOD AND DEVICE OF RECYCLABLE LOGISTICS APPARATUS

FIELD OF THE INVENTION

The present invention relates to the logistics field, particularly relates to wireless authentication method and device of recyclable logistics apparatus.

BACKGROUND OF THE INVENTION

In the logistics field, it may often track recyclable logistics apparatus. RFID (radio frequency tag) technology is common means for tracking cargos/apparatuses which is implemented in the intelligent logistics field, especially active RFID has good effect of tracking devices/apparatuses at medium distance. In the logistics field, it may often identify recyclable logistics apparatus, and wireless authentication technology is commonly used for product identification and delivery management, which is key and focus for intelligent management of logistics apparatus. At present, mature identification methods are common in the use of a special-shaped door frame (with RFID or other wireless signal reader) or a fixed reader, and when a wireless tag or an object equipment approaches or passes through the reader, a target equipment is identified by judging a proximity distance. This requires target equipments to flow in sequence and in a certain order, where the efficiency for identification of a large batch of target equipments and delivery management is low. In addition, recyclable logistics apparatus may also be based on iBeacon technology instead of RFID, and iBeacon protocol is a protocol developed by Apple Company which performs a very accurate micro-positioning through low-power Bluetooth (BLE), and begins to be supported from IOS7.0 and Android 4.3. Through this technology, an equipment may receive a certain range of signals transmitted by other iBeacons, meanwhile may also transmit its own information to other users in a certain range. But at this time, there still exists the above problem of low efficiency for identification and delivery management.

SUMMARY OF THE INVENTION

The purpose of the present invention is to provide wireless authentication method and device of recyclable logistics apparatus, which can identify recyclable logistics apparatus conveniently and improve the identification efficiency.

In order to solve the above technical problem, one embodiment of the present invention discloses a wireless authentication method of recyclable logistics apparatus, the recyclable logistics apparatus comprises a wireless beacon unit which periodically transmits a broadcast frame, the broadcast frame at least includes a unique identity of the wireless beacon unit, and the wireless authentication method comprises the following steps: first mobile terminal receives the broadcast frame and uploads collected first frame information as first upload information to a cloud server, the cloud server generates authentication information according to an authentication rule; the cloud server associates the first upload information with the authentication information and stores them in a database; and the cloud server transmits the authentication information to second mobile terminal, the second mobile terminal also receives the broadcast frame, and through the authentication information, collected second frame information is compared with the first frame information which is associated with the authentication information so as to complete delivery.

Another embodiment of the present invention discloses a wireless authentication method of recyclable logistics apparatus, the recyclable logistics apparatus comprises a wireless beacon unit which periodically transmits a broadcast frame, the broadcast frame at least includes a unique identity of the wireless beacon unit, and the wireless authentication method comprises the following steps: first mobile terminal receives the broadcast frame, uploads collected first frame information as first upload information to a cloud server, and generates authentication information according to an authentication rule; the cloud server associates the first upload information with the authentication information and stores them in a database; and the first mobile terminal transmits the authentication information to second mobile terminal, the second mobile terminal also receives the broadcast frame, and through the authentication information, collected second frame information is compared with the first frame information which is associated with the authentication information so as to complete delivery.

Another embodiment of the present invention further discloses a wireless authentication device of recyclable logistics apparatus, the recyclable logistics apparatus comprises a wireless beacon unit which periodically transmits a broadcast frame, the broadcast frame at least includes a unique identity of the wireless beacon unit, and the wireless authentication device comprises: an uploading module which configures first mobile terminal to receive the broadcast frame and upload collected first frame information as first upload information to a cloud server, and configures the cloud server to generate authentication information according to an authentication rule; an associating module which configures the cloud server to associate the first upload information with the authentication information and store them in a database; and a comparing module which configures the cloud server to transmit the authentication information to second mobile terminal, configures the second mobile terminal also to receive the broadcast frame, and compares, through the authentication information, collected second frame information with the first frame information which is associated with the authentication information so as to complete delivery.

Another embodiment of the present invention discloses a wireless authentication device of recyclable logistics apparatus, the recyclable logistics apparatus comprises a wireless beacon unit which periodically transmits a broadcast frame, the broadcast frame at least includes a unique identity of the wireless beacon unit, and the wireless authentication device comprises: an uploading module which configures first mobile terminal to receive the broadcast frame, upload collected first frame information as first upload information to a cloud server, and generate authentication information according to an authentication rule; an associating module which configures the cloud server to associate the first upload information with the authentication information and store them in a database; and a comparing module which configures the first mobile terminal to transmit the authentication information to second mobile terminal, configures the second mobile terminal also to receive the broadcast frame, and compares, through the authentication information, collected second frame information with the first frame information which is associated with the authentication information so as to complete delivery.

Comparing the embodiments of this invention with prior arts, the main distinctions and their effects are:

A user only needs a mobile terminal to automatically receive a broadcast frame to complete an identification operation, and authentication of a cloud server ensures security, thus it is simple to operate, has low cost and high security.

Further, the cloud server generating authentication information according to an authentication rule refers to the cloud server generating authentication information at least according to one of the following information: geographical location information of the first mobile terminal, enterprise name information, time information, and information of products loaded in the recyclable logistics apparatus, thereby improving the identification accuracy.

Further, the recyclable logistics apparatuses are stacked as a plurality of stacks, and when one recyclable logistics apparatus in a stack is marked out, all the recyclable logistics apparatuses in this stack are marked out, thereby doubling the identification efficiency.

DETAILED DESCRIPTION OF THE PREFERRED EMBODIMENTS

In the following description, many technical details are provided for readers to better understand the present application. However, it is understood by those ordinary skilled in the art that the technical solution claimed to be protected by those claims of the present application can also be realized even without these technical details and not based on various changes and modifications of the following embodiments.

For the purpose, technical solution and merits of the present invention to be clearer, the following will further describe the embodiments of the present invention in detail with reference to the accompanying drawings.

Figure 1:
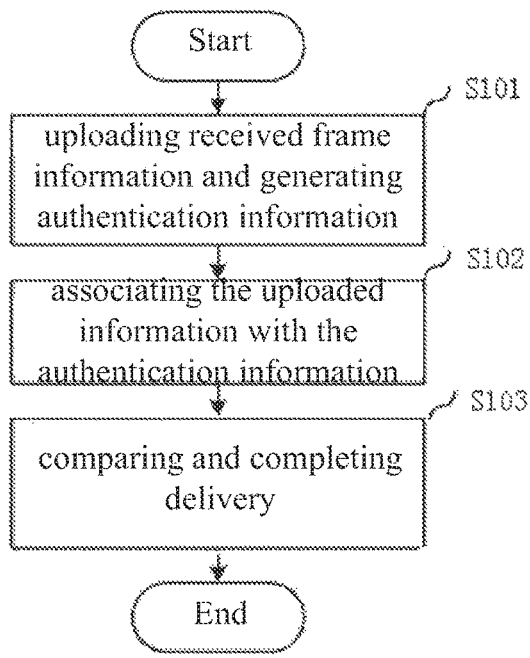
FIG. 1 is a flow diagram of a wireless authentication method of recyclable logistics apparatus according to first embodiment of the present invention.

The first embodiment of the present invention relates to a wireless authentication method of recyclable logistics apparatus. The recyclable logistics apparatus comprises a wireless beacon unit, the wireless beacon unit periodically transmits a broadcast frame, and the broadcast frame at least includes a unique identity of the wireless beacon unit. Preferably, the wireless beacon unit is a chip based on one of the following protocols: RFID, Zigbee (Zigbee), Bluetooth, WiFi, iBeacon. Of course, the wireless beacon unit may also be a chip based on other protocol, which is not limited. FIG. 1 is a flow diagram of the wireless authentication method.

As shown in FIG. 1, the wireless authentication method comprises the following steps:

At step S101, first mobile terminal receives the broadcast frame and uploads collected first frame information as first upload information to a cloud server, and the cloud server generates authentication information according to an authentication rule. For example, in the case where a batch of recyclable logistics apparatuses are identified and transported from a sender to a receiver through a transporter, the first mobile terminal, for example, a smartphone belonging to the sender of the recyclable logistics apparatuses, can learn how many recyclable logistics apparatuses required to be identified by receiving the broadcast frames, and their unique identities (UUID) of wireless beacon units are uploaded to the cloud server. The cloud server generates authentication information according to an authentication rule after having received the unique identities of wireless beacon units of those recyclable logistics apparatuses required to be identified.

Preferably, the broadcast frame further includes identification information of the wireless beacon unit, and before the first mobile terminal receives the broadcast frame, the identification information in the broadcast frames transmitted by the wireless beacon units on all the recyclable logistics apparatuses required to be identified are changed, so that all the recyclable logistics apparatuses required to be identified are marked out. Still taking the above case as example, when the wireless beacon unit is a chip based on iBeacon protocol, the structure of the broadcast frame is: UUID domain, Major domain, Minor domain, RSSI domain. Wherein, UUID (Universally Unique Identifier) domain is a unique serial number of an apparatus, i.e. the unique identity of the wireless beacon unit, RSSI domain is wireless signal strength information which indicates a strength value of a node signal received by a receiving equipment, and the remaining Major domain and Minor domain are dynamic information domains which may contain various information based on intra-domain encoded information. At this time, a specific bit in the broadcast frame (for example, the most significant bit in Major domain) is initially set to 0, which is taken as the identification information, and if 0 is changed to 1, it is marked.

In the process of marking, the recyclable logistics apparatuses are preferably stacked as a plurality of stacks, and when one recyclable logistics apparatus in a stack is marked out, all the recyclable logistics apparatuses in this stack are marked out. This stack method will be described in detail later.

Preferably, the cloud server generating authentication information according to an authentication rule refers to the cloud server generating authentication information at least according to one of the following information: geographical location information of the first mobile terminal, enterprise name information, time information, information of products loaded in the recyclable logistics apparatus. In this way, it is advantageous to check the following information: geographical location of the sender of recyclable logistics apparatus, name of the sender of recyclable logistics apparatus, sending time of the sender of recyclable logistics apparatus, products loaded in the recyclable logistics apparatus to be sent. Of course, authentication information may also be generated according to other authentication rule, which is not limited.

Then proceeds to step S102, the cloud server associates the first upload information with the authentication information and stores them in a database. In this way, it can prepare for subsequent processing.

Then proceeds to step S103, the cloud server transmits the authentication information to second mobile terminal, and the second mobile terminal also receives the broadcast frame and through the authentication information, collected second frame information is compared with the first frame information which is associated with the authentication information so as to complete delivery. Still taking the above case as example, if the first mobile terminal belongs to the sender, the second mobile terminal may belong to the transporter or the receiver, and as the transporter or the receiver, how many recyclable logistics apparatuses required to be identified can be learned by receiving the broadcast frames, then authentication can be performed according to the association relation of the previous step, which ensures the data at both sides of the sender and the transporter, or the data at both sides of the sender and the receiver consistent so as to perform delivery smoothly.

Preferably, the second mobile terminal also uploads the collected second frame information to the cloud server, so that the cloud server performs the above comparison.

Further preferably, as mentioned above, when iBeacon protocol is utilized, a specific bit in the broadcast frame (for example, the most significant bit in Major domain) is initially set to 0, which is taken as the identification information, and after it is marked out when 0 is changed to 1, the second mobile terminal also uploads the collected second frame information to the cloud server so that the cloud server performs the above comparison.

Preferably, the second mobile terminal obtains the first frame information associated with the authentication information from the cloud server so that the second mobile terminal performs the above comparison. Still taking the above case as example, when the data at both sides of the sender and the transporter, or the data at both sides of the sender and the receiver are not consistent, this step also serves as a reminder, for example, when a recyclable logistics apparatus included in second upload information uploaded by the receiver comprises other apparatus which is not included from the authentication information, the authentication of the cloud server will make screening according to the authentication information, so as to filter out the apparatus not belonging to this send. Another case is, for example, when the recyclable logistics apparatus included in the second upload information uploaded by the receiver lacks the apparatus which should be included from the authentication information, the authentication of the cloud server would remind whether a detection or an upload is missed.

Further preferably, after the second mobile terminal performs the above comparison, the second mobile terminal uploads a comparison result to the cloud server.

Then ends the flow.

In conclusion, a user only needs a mobile terminal to automatically receive a broadcast frame to complete an identification operation, and authentication of a cloud server ensures security, thus it is simple to operate, has low cost and high security.

The method embodiments of the present invention all can be realized by software, hardware and firmware etc. Regardless of the present invention is realized by software, or hardware, or firmware, instruction codes can be stored in any type of computer accessible memory (such as permanent or can be modified, volatile or non-volatile, solid-state or non solid, fixed or replaceable medium etc.). Similarly, the memory can be, for example, programmable array logic (PAL), random access memory (RAM), programmable read only memory (PROM), read-only memory (ROM), electrically erasable programmable ROM (EEPROM), floppy disc, optical disc, and digital versatile disc (DVD) etc.

The above stack case will be described in detail with reference to FIGS. 2-7 in the following.

Figure 2:
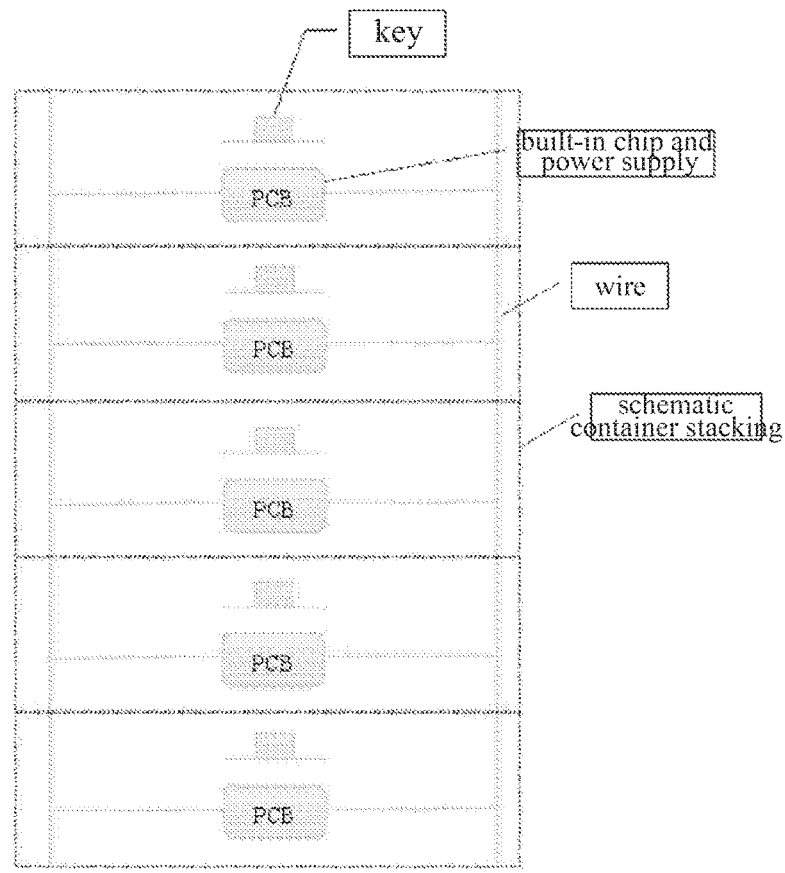
FIG. 2 is a schematic diagram of a stacking method of recyclable logistics apparatuses according to first embodiment of the present invention.
Figure 3:
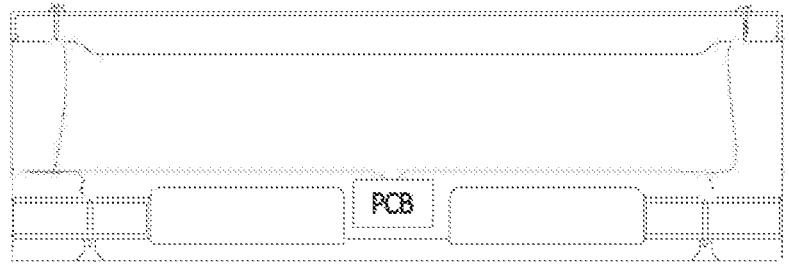
FIG. 3 is a wiring diagram of a single recyclable logistics apparatus in the stacking method of FIG. 2 when being folded and upright.
Figure 3:
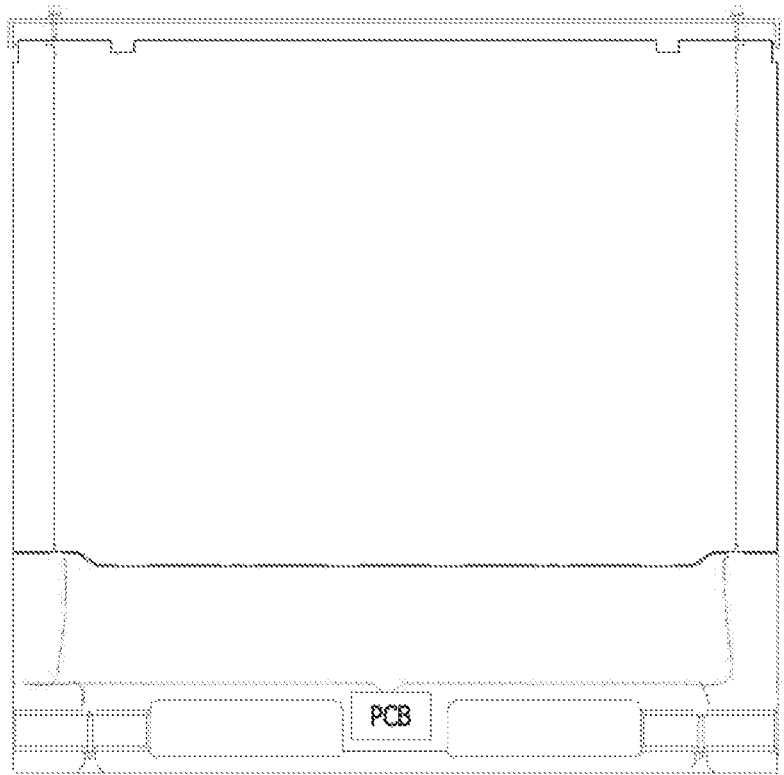

As shown in FIG. 2, when stacked, the wireless beacon units built in respective containers are connected with contact points between box components and between boxes through wires, thereby forming a parallel structure of circuits. FIG. 3 shows a wiring diagram of a single apparatus in the stack shown in FIG. 2 when being folded and upright. The connection is made, for example, by wires, contact points and spring needles etc.

An exemplary stacking process of recyclable logistics apparatuses is as following:

(1) Corresponding wires are implanted inside the apparatus for connecting to the wireless beacon unit, contact points etc.

Figure 4:
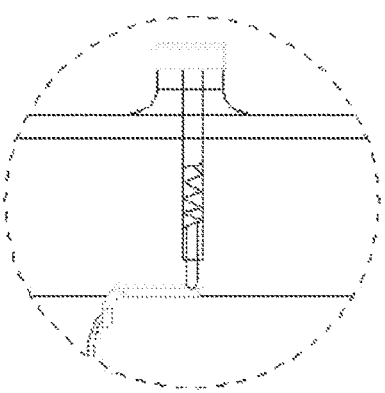
FIG. 4 is an enlarged schematic view of spring sheets connection in the wiring of FIG. 3.
Figure 5:
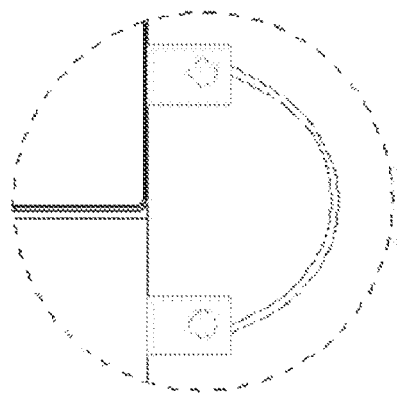
FIG. 5 is an enlarged schematic view of external wire or connector connection in the wiring of FIG. 3.
Figure 6:
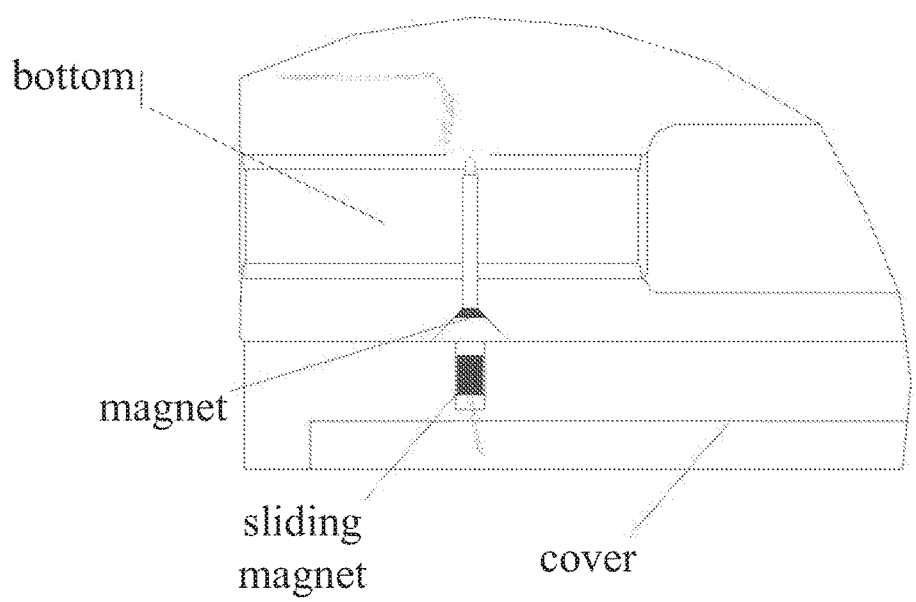
FIG. 6 is an enlarged schematic view of magnetic adsorption connection in the wiring of FIG. 3.

(2) There can be a plurality of connection types between contact points, such as spring sheets connection, external wire connection, magnetic adsorption connection etc. FIGS. 4-6 respectively show these connection types in an exemplary manner.

(3) Components of the recyclable logistics apparatus itself, two stacked recyclable logistics apparatuses all can be connected through the mentioned connection types. When the connections are OK, circuits will be formed in a region inside this stack of logistics apparatuses and become parallel.

Figure 7:
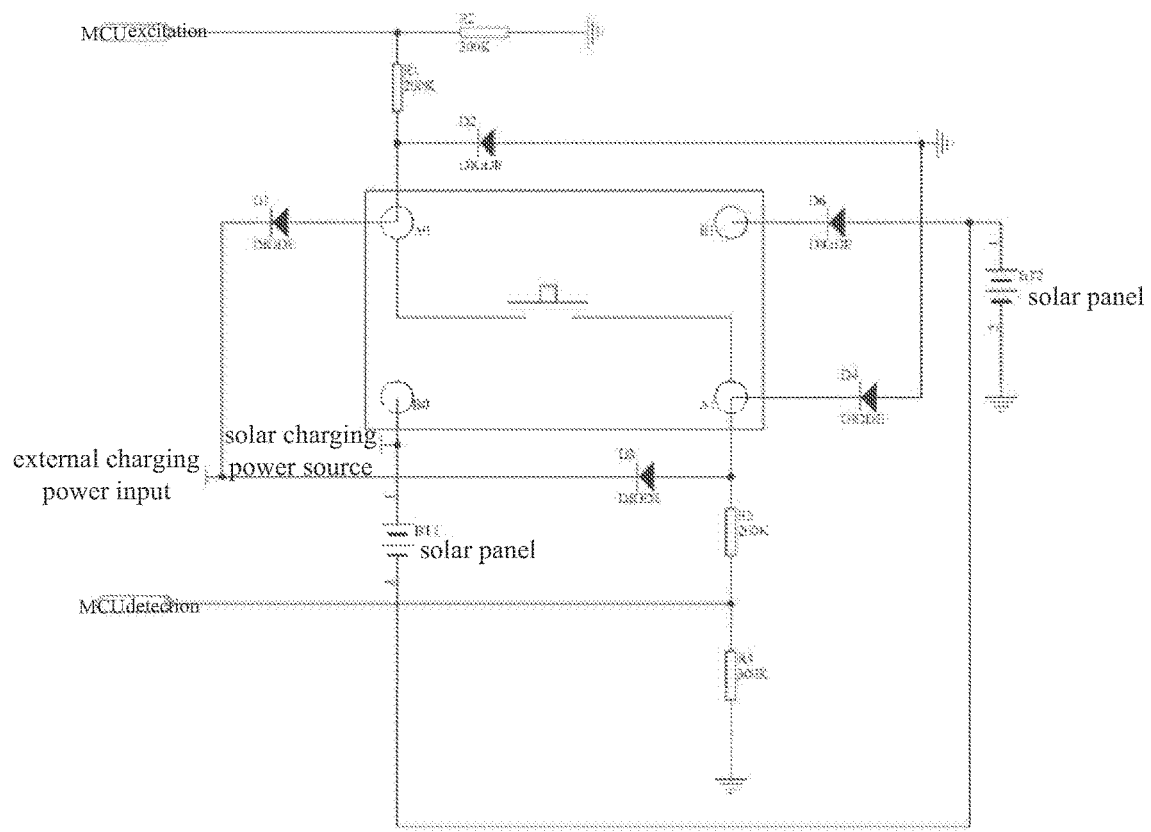
FIG. 7 is internal circuit diagram of a single recyclable logistics apparatus in the stacking method of FIG. 2.

(4) Four corners of the recyclable logistics apparatus are provided with four contact points, positive and negative electrodes are set apart (i.e. polarities along a diagonal direction are same, such as the electrodes along one diagonal direction are both positive, and the electrodes along the other diagonal direction are both negative), and in consideration of disorderly stacking along the same direction, a bridge rectifier circuit is utilized on an internal line of the box to ensure that even if opposite electrodes are connected, boxes can still be connected with each other and conduct power or signal. The internal circuit diagram is shown in FIG. 7.

As described above, when electrical loops are formed inside recyclable logistics apparatuses and can be connected with each other when stacked, a foundation is laid for subsequent work. For example, when subsequent identification is performed, a workload of later identification will be greatly reduced, which doubles the work efficiency and reduces labor and time costs.

Figure 8:
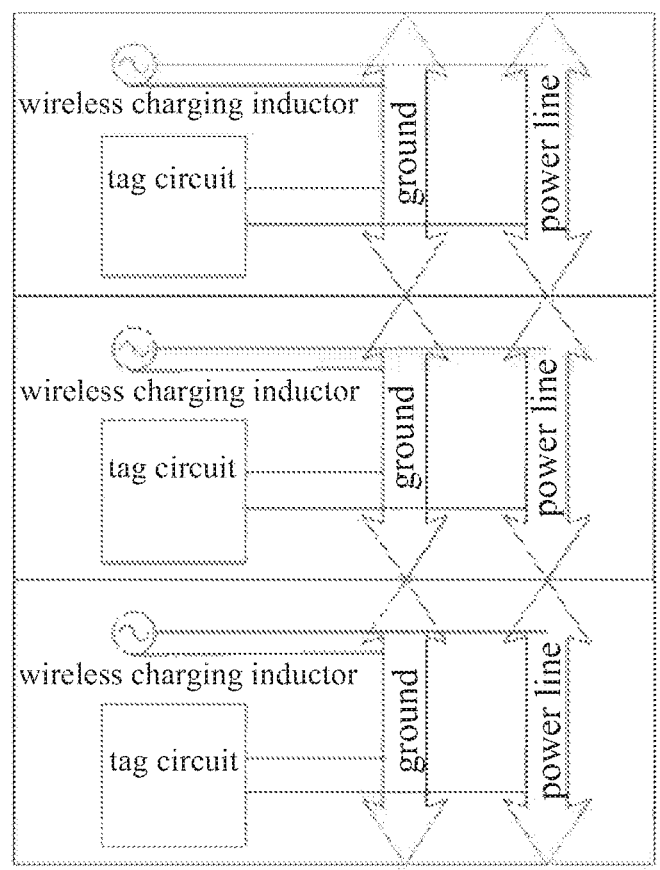
FIG. 8 is a schematic diagram of the stacking method in FIG. 2 utilized for a charging process.

After the above stacking, subsequent work is not only limited to identification, and other work may also be done, such as power charging. At this time, when a stack of apparatuses are located in a wireless charging area, all apparatuses in this stack can be charged when a power receiving module within any apparatus is coupled with or in magnetic resonance with or in magnetic induction with an external power transmitting module. FIG. 8 is a schematic diagram of this charging process. As shown in FIG. 8, because logistics apparatuses are connected with each other through lines when stacked, a stack of apparatuses can supply power to each other, and plus the use of the bridge rectifier circuit, it would not affect supplying power to each other even if the apparatus is stacked in reverse direction.

In the above case where subsequent charging is performed, a specific bit in the broadcast frame may include battery power information. A battery built in the apparatus may be sustainably used for about two years in general case, and when the battery power insufficiency of the built-in battery is detected, the battery power information will be continuously broadcasted outward, meanwhile a prompt unit on the apparatus provides a prompt, for example, two LEDs are provided in a diagonal of the apparatus as the prompt unit and the LED starts to emit light (for example turning red) so as to warn that the battery power is low. When it is fully charged, the battery power information broadcasted outward shows that the battery power is normal, and the prompt unit does not provide a prompt so that the warning is removed. In this way, it is substantially possible to increase the battery life of a power supply unit of the wireless beacon unit from original two years or so to about eight years which is close to the life of the recyclable logistics apparatus itself, so that it is not necessary to make replacement frequently.

Figure 9:
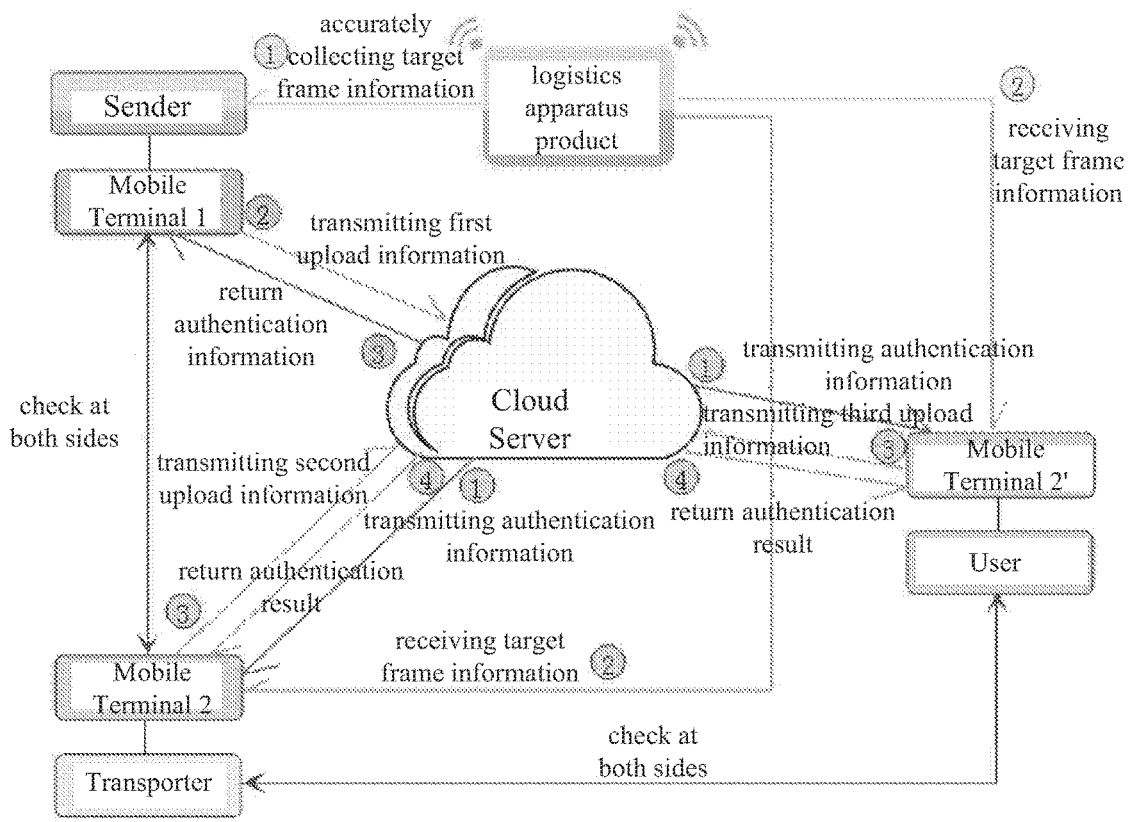
FIG. 9 is a schematic diagram of an application scenario of the wireless authentication method of recyclable logistics apparatus according to first embodiment of the present invention.

FIG. 9 is a schematic diagram of an application scenario of the wireless authentication method in the above embodiment.

As shown in FIG. 9, a sender needs to provide recyclable logistics apparatus product to a user through a transporter, the logistics apparatus product comprises a wireless beacon unit based on iBeacon protocol which periodically transmits a broadcast frame, the broadcast frame at least includes UUID of the wireless beacon unit and identification information in Major domain, and all the recyclable logistics apparatus(es) required to be identified, i.e. all the recyclable logistics apparatus(es) required to be transported, are marked by changing the identification information in Major domain; mobile terminal 1 of the sender receives the broadcast frames, and uploads unique identity(es) of the wireless beacon unit(s) of the marked recyclable logistics apparatus(es) as first upload information to a cloud server; the cloud server generates authentication information, associates the authentication information with the first upload information and stores them in a database. When the transporter operates, mobile terminal 2 of the transporter also receives the broadcast frame(s), the cloud server returns the authentication information to the mobile terminal 1 of the sender and the mobile terminal 2 of the transporter, and the mobile terminal 2 uploads the unique identity(es) of the wireless beacon unit(s) of the marked recyclable logistics apparatus(es) and the authentication information together as second upload information to the cloud server for authentication. The cloud server returns an authentication result of the first upload information and the second upload information based on the authentication information to the mobile terminal 2. The sender and the transporter may check and deliver according to the information received respectively. Similarly, when the user operates, mobile terminal 2' of the user also receives the broadcast frame(s), the cloud server returns the authentication information to the mobile terminal 2 of the transporter and the mobile terminal 2' of the user, and the mobile terminal 2' uploads the unique identity(es) of the wireless beacon unit(s) of the marked recyclable logistics apparatus(es) and the authentication information together as third upload information to the cloud server for authentication. The cloud server returns an authentication result of the second upload information and the third upload information based on the authentication information to the mobile terminal 2'. The sender and the user may check and deliver according to the information received respectively.

The above application scenario is merely an example, and the practical application of the present invention is not limited thereto.

Preferably, a mobile terminal is, for example, a mobile phone, a tablet computer, a notebook computer, a personal digital assistant (PDA) etc.

The second embodiment of the present invention also relates to a wireless authentication method of recyclable logistics apparatus. This embodiment is similar to the first embodiment, and the distinction lies in: at step S101, the authentication information is generated according to the authentication rule by the first mobile terminal rather than by the cloud server, meanwhile at step S103, the authentication information is transmitted to the second mobile terminal by the first mobile terminal rather than by the cloud server. This embodiment is substantially similar to the first embodiment, and correlated technical details disclosed in the first embodiment are still effective in this embodiment and will not be repeated here in order to reduce duplication.

Figure 10:
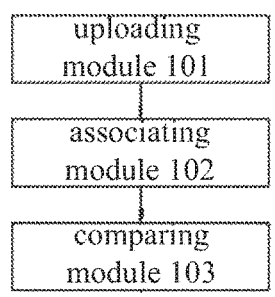
FIG. 10 is a structure diagram of a wireless authentication device of recyclable logistics apparatus according to second embodiment of the present invention.

The third embodiment of the present invention relates to a wireless authentication device of recyclable logistics apparatus. FIG. 10 is a schematic diagram of the wireless authentication device. The practical structure of the present invention may be made necessary adjustments according to actual requirements and is not limited to the structure in FIG. 10.

As shown in FIG. 10, the wireless authentication device 100 comprises:

an uploading module 101 which configures first mobile terminal to receive a broadcast frame and upload collected first frame information as first upload information to a cloud server, the cloud server generates authentication information according to an authentication rule;

an associating module 102 which configures the cloud server to associate the first upload information with the authentication information and store them in a database; and a comparing module 103 which configures the cloud server to transmit the authentication information to second mobile terminal, configures the second mobile terminal also to receive the broadcast frame, and compares, through the authentication information, collected second frame information with the first frame information which is associated with the authentication information so as to complete delivery.

The first embodiment is the method embodiment corresponding to this embodiment, and this embodiment and the first embodiment can be implemented in cooperation with each other. Correlated technical details disclosed in the first embodiment are still effective in this embodiment and will not be repeated here in order to reduce duplication. Correspondingly, correlated technical details disclosed in this embodiment can also be applied in the first embodiment.

The fourth embodiment of the present invention relates to a wireless authentication device of recyclable logistics apparatus which is the device embodiment corresponding to the second embodiment, and correlated technical details disclosed in the second embodiment are still effective in this embodiment and will not be repeated here in order to reduce duplication.

It should be explained that in the Claims and Description of the present invention, relationship terms such as first, second etc are just utilized to distinguish one entity or manipulation from another entity or manipulation, instead of requiring or indicating any practical relation or sequence existing between these entities or manipulations. And, the terms "include", "comprise" or any other variant indicate to nonexclusive covering, thus the process, method, article or equipment including a series of elements not only includes those elements, but also includes other elements which are not definitely listed, or inherent elements of this process, method, article or equipment. Without more limitations, the element defined by the phrase "include a" does not exclude additional same elements existing in the process, method, article or equipment of this element.

By referring to some preferred embodiments of this invention, this invention has been illustrated and described. But it should be understood to those skilled in the art that various other changes in the forms and details may be made without departing from the principles and scope of the invention.

What is claimed is:

1. A wireless authentication method of recyclable logistics apparatus, the recyclable logistics apparatus comprises a wireless beacon unit which periodically transmits a broadcast frame, the broadcast frame at least includes a unique identity of the wireless beacon unit,
   a plurality of recyclable logistics apparatuses is capable of being stacked as a plurality of stacks; when stacked, wireless beacon units built in respective recyclable logistics apparatuses are connected with contact points between recyclable logistics apparatuses components and between the recyclable logistics apparatuses through wires, thereby forming a parallel structure of circuits; and the broadcast frame further includes identification information of the wireless beacon unit, if the identification information of the wireless beacon unit of one recyclable logistics apparatus in a stack is changed, the identification information of the wireless beacon units of all the recyclable logistics apparatuses in the stack are all changed;
   wherein, the wireless authentication method comprises the following steps:
   first mobile terminal receives a first broadcast frame and uploads information collected from the first broadcast frame as first upload information to a cloud server, the cloud server generates authentication information according to an authentication rule;
   the cloud server associates the first upload information with the authentication information and stores them in a database; and
   the cloud server transmits the authentication information to second mobile terminal, the second mobile terminal receives a second broadcast frame, and through the authentication information, information collected from the second broadcast frame is compared with the information collected from the first broadcast frame which is associated with the authentication information;
   wherein in the step that through the authentication information, information collected from the second broadcast frame is compared with the information collected from the first broadcast frame which is associated with the authentication information, the second mobile terminal also uploads the information collected from the second broadcast frame to the cloud server so that the cloud server performs the comparison; or
   wherein in the step that through the authentication information, information collected from the second broadcast frame is compared with the information collected from the first broadcast frame which is associated with the authentication information, the second mobile terminal obtains the information collected from the first broadcast frame which is associated with the authentication information from the cloud server so that the second mobile terminal performs the comparison.

2. The wireless authentication method according to claim 1, wherein in the step that generates authentication information according to an authentication rule, the authentication information at least according to one of following information: geographical location information of the first mobile terminal, enterprise name information, time information, information of product(s) loaded in the recyclable logistics apparatus.

3. The wireless authentication method according to claim 1, wherein after the second mobile terminal performs comparison, the second mobile terminal uploads a comparison result to the cloud server.

4. The wireless authentication method according to claim 1, wherein the wireless beacon unit is a chip based on one of the following protocols: RFID, Zigbee, Bluetooth, WiFi, iBeacon.

5. A wireless authentication method of recyclable logistics apparatus, the recyclable logistics apparatus comprises a wireless beacon unit which periodically transmits a broadcast frame, the broadcast frame at least includes a unique identity of the wireless beacon unit,
   a plurality of recyclable logistics apparatuses is capable of being stacked as a plurality of stacks; when stacked, wireless beacon units built in respective recyclable logistics apparatuses are connected with contact points between recyclable logistics apparatuses components and between the recyclable logistics apparatuses through wires, thereby forming a parallel structure of circuits; and the broadcast frame further includes identification information of the wireless beacon unit, if the identification information of the wireless beacon unit of one recyclable logistics apparatus in a stack is changed, the identification information of the wireless beacon units of all the recyclable logistics apparatuses in the stack are all changed;
   wherein, the wireless authentication method comprises the following steps:
   first mobile terminal receives a first broadcast frame, uploads information collected from the first broadcast frame as first upload information to a cloud server, and generates authentication information according to an authentication rule;
   the cloud server associates the first upload information with the authentication information and stores them in a database; and
   the first mobile terminal transmits the authentication information to second mobile terminal, the second mobile terminal receives a second broadcast frame, and through the authentication information, information collected from the second broadcast frame information is compared with the information collected from the first broadcast frame which is associated with the authentication information;
   wherein in the step that through the authentication information, information collected from the second broadcast frame is compared with the information collected from the first broadcast frame which is associated with the authentication information, the second mobile terminal also uploads the information collected from the second broadcast frame to the cloud server so that the cloud server performs the comparison; or
   wherein in the step that through the authentication information, information collected from the second broadcast frame is compared with the information collected from the first broadcast frame which is associated with the authentication information, the second mobile terminal obtains the information collected from the first broadcast frame which is associated with the authentication information from the cloud server so that the second mobile terminal performs the comparison.

6. A wireless authentication device of recyclable logistics apparatus, the recyclable logistics apparatus comprises a wireless beacon unit which periodically transmits a broadcast frame, the broadcast frame at least includes a unique identity of the wireless beacon unit, a plurality of recyclable logistics apparatuses is capable of being stacked as a plurality of stacks; when stacked, wireless beacon units built in respective recyclable logistics apparatuses are connected with contact points between recyclable logistics apparatuses components and between the recyclable logistics apparatuses through wires, thereby forming a parallel structure of circuits; and the broadcast frame further includes identification information of the wireless beacon unit, if the identification information of the wireless beacon unit of one recyclable logistics apparatus in a stack is changed, the identification information of the wireless beacon units of all the recyclable logistics apparatuses in the stack are all changed;

wherein, the wireless authentication device comprises:

an uploading module which configures first mobile terminal to receive-a first broadcast frame and upload information collected from the first broadcast frame as first upload information to a cloud server, and configures the cloud server to generate authentication information according to an authentication rule;

an associating module which configures the cloud server to associate the first upload information with the authentication information and store them in a database; and a comparing module which configures the cloud server to transmit the authentication information to second mobile terminal, configures the second mobile terminal to receive a second broadcast frame, and compares, through the authentication information, information collected from the second broadcast frame with the information collected from the first frame which is associated with the authentication information;

wherein the comparing module further configures the second mobile terminal to upload the information collected from the second broadcast frame to the cloud server so that the cloud server performs the comparison; or wherein the comparing module further configures the second mobile terminal to obtain the information collected from the first broadcast frame which is associated with the authentication information from the cloud server so that the second mobile terminal performs the comparison.

7. A wireless authentication device of recyclable logistics apparatus, the recyclable logistics apparatus comprises a wireless beacon unit which periodically transmits a broadcast frame, the broadcast frame at least includes a unique identity of the wireless beacon unit, a plurality of recyclable logistics apparatuses is capable of being stacked as a plurality of stacks; when stacked, wireless beacon units built in respective recyclable logistics apparatuses are connected with contact points between recyclable logistics apparatuses components and between the recyclable logistics apparatuses through wires, thereby forming a parallel structure of circuits; and the broadcast frame further includes identification information of the wireless beacon unit, if the identification information of the wireless beacon unit of one recyclable logistics apparatus in a stack is changed, the identification information of the wireless beacon units of all the recyclable logistics apparatuses in the stack are all changed;

wherein, the wireless authentication device comprises:

an uploading module which configures first mobile terminal to receive a first broadcast frame, upload information collected from the first broadcast frame as first upload information to a cloud server, and generate authentication information according to an authentication rule;

an associating module which configures the cloud server to associate the first upload information with the authentication information and store them in a database; and a comparing module which configures the first mobile terminal to transmit the authentication information to second mobile terminal, configures the second mobile terminal to receive a second broadcast frame, and compares, through the authentication information, information collected from the second broadcast frame with the information collected from the first broadcast frame which is associated with the authentication information;

wherein the comparing module further configures the second mobile terminal to upload the information collected from the second broadcast frame to the cloud server so that the cloud server performs the comparison; or wherein the comparing module further configures the second mobile terminal to obtain the information collected from the first broadcast frame which is associated with the authentication information from the cloud server so that the second mobile terminal performs the comparison.

* * * * *